United States Patent
Wang et al.

(10) Patent No.: US 10,145,585 B1
(45) Date of Patent: Dec. 4, 2018

(54) VACUUM HEAT TRANSFER TYPE EFFICIENT SOLAR PANEL HEAT ABSORPTION SYSTEM

(71) Applicant: HENAN SHUIMU ENVIRONMENTAL TECHNOLOGY CO., LTD, Zhengzhou, Henan (CN)

(72) Inventors: Bo Wang, Henan (CN); Wanpin Tian, Henan (CN); Zhenyu Luo, Henan (CN); Shuhong Song, Henan (CN); Yuanhui Guo, Henan (CN); Yulong Chen, Henan (CN); Shixi Wang, Henan (CN); Wanying Wang, Henan (CN); Huanhuan Xia, Henan (CN); Guangyin Liu, Henan (CN); Boheng Hao, Henan (CN)

(73) Assignee: HENAN SHUIMU ENVIRONMENTAL TECHNOLOGY CO., LTD, Zhengzhou, Henan (CN)

( * ) Notice: Subject to any disclaimer, the term of this patent is extended or adjusted under 35 U.S.C. 154(b) by 0 days.

(21) Appl. No.: 15/659,299

(22) Filed: Jul. 25, 2017

(51) Int. Cl.
*F24S 10/50* (2018.01)
*F24S 10/70* (2018.01)
(Continued)

(52) U.S. Cl.
CPC ............. *F24S 70/60* (2018.05); *F24S 10/50* (2018.05); *F24S 10/70* (2018.05); *F24S 10/744* (2018.05); *F24S 20/20* (2018.05)

(58) Field of Classification Search
CPC ......... Y02E 10/40; Y02E 10/41; Y02E 10/42; Y02E 10/44; Y02E 10/45; F24S 20/00;
(Continued)

(56) References Cited

U.S. PATENT DOCUMENTS

| | | | | |
|---|---|---|---|---|
| 3,875,926 A | * | 4/1975 | Frank | C02F 1/14 126/635 |
| 4,232,656 A | * | 11/1980 | Teagan | F24S 60/00 126/588 |

(Continued)

*Primary Examiner* — Mark Laurenzi
*Assistant Examiner* — Mickey France
(74) *Attorney, Agent, or Firm* — Hamre, Schumann, Mueller & Larson, P.C.

(57) ABSTRACT

The present invention provides a vacuum heat transfer type efficient solar panel heat absorption system, including a flat plate collector, wherein a heat absorption coil is arranged in the flat plate collector, and a heat absorption coil valve is arranged on the heat absorption coil stretching out from the flat plate collector; a heat exchange coil is arranged in a pressure bearing water tank, a water inlet and a water outlet are formed in the pressure bearing water tank, a vacuum pump is arranged on a heat transfer pipeline, the heat absorption coil, the heat transfer pipeline and the heat exchange coil are all copper tubes, the interiors of the copper tubes are in vacuum states, and heat absorption coating is coated on an outer surface of the heat absorption coil. In the present invention, the interiors of the copper tubes are vacuumized, when a part of energy radiated by the sun is transferred onto the copper tubes in a heat collection plate, this part of energy is directly, quickly and efficiently transferred to a copper coil in the water tank through the copper tubes, as the interiors of the copper tubes are vacuumized, and the polyurethane at the outside of the tubes preserve the heat in the process, the heat transfer efficiency is greatly improved, and the heat loss during the heat transfer of a flowing medium in the tubes in a circulation process is greatly reduced.

6 Claims, 1 Drawing Sheet

(51) Int. Cl.
*F24S 70/60* (2018.01)
*F24S 20/20* (2018.01)

(58) Field of Classification Search
CPC .. F24S 20/02; F24S 20/20; F24S 20/25; F24S 20/40; F24S 20/60; F24S 20/61; F24S 60/30; F24S 70/10; F24S 70/12; F24S 70/60
USPC ....... 60/641.8, 641.11, 641.15; 126/569–713
See application file for complete search history.

(56) References Cited

U.S. PATENT DOCUMENTS

| | | | | |
|---|---|---|---|---|
| 4,326,499 A * | 4/1982 | Koskela | ............... | F24S 40/60 |
| | | | | 126/588 |
| 4,342,196 A * | 8/1982 | Yeh | ............... | F03G 3/00 |
| | | | | 60/531 |
| 4,479,605 A * | 10/1984 | Billotte | ............... | F24D 11/003 |
| | | | | 122/16.1 |
| 4,510,922 A * | 4/1985 | Roussos | ............... | F24D 11/003 |
| | | | | 126/616 |
| 4,574,779 A * | 3/1986 | Hayes | ............... | F24D 17/0021 |
| | | | | 126/641 |
| 4,603,685 A * | 8/1986 | Jean | ............... | F24D 11/003 |
| | | | | 126/587 |
| 4,918,938 A * | 4/1990 | De Forest | ............... | F24H 4/04 |
| | | | | 126/642 |
| 2004/0237557 A1 * | 12/2004 | Harmon | ............... | F24H 1/181 |
| | | | | 62/238.6 |

\* cited by examiner

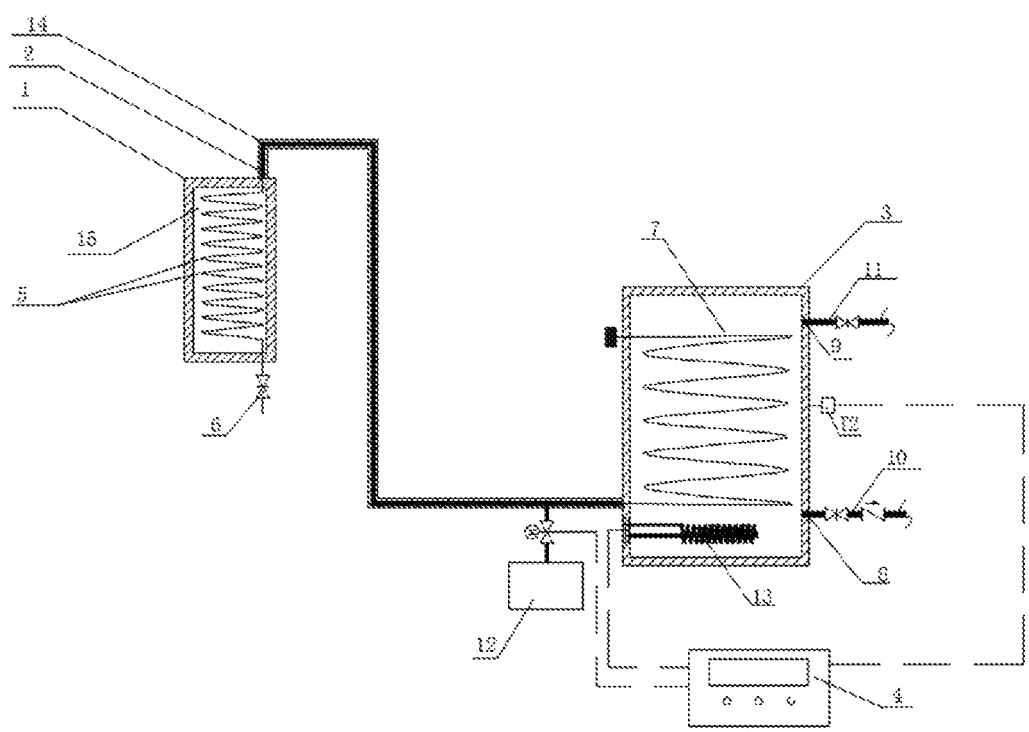

VACUUM HEAT TRANSFER TYPE EFFICIENT SOLAR PANEL HEAT ABSORPTION SYSTEM

FIELD OF THE INVENTION

The present invention belongs to the technical field of solar heat utilization, and in particular to a vacuum heat transfer type efficient solar panel heat absorption system.

BACKGROUND OF THE INVENTION

In the field of solar heat utilization, there are an all-glass vacuum heat collection tube, and a vacuum heat collection tube with two open ends formed by sheathing an evacuated glass tube at the outside of a metal tube with two open ends at present, the shortcomings of this vacuum heat collection tube with two open ends lie in that as the evacuated glass tube must be double-layer, the manufacturing cost is high, in a use process, the inner layer glass is close to the metal tube coated with heat absorption coating, so the temperature of the inner layer glass is higher, and when the temperature of the outer layer glass is lower, a risk of bursting is caused by a larger temperature difference of the inner layer glass and the outer layer glass.

Therefore, the vacuum tube composed of double-layer glass is changed into a single-layer glass tube, and both ends of the single-layer glass tube are welded and hermetically connected to an expansion alloy ring, a metal corrugated pipe, a metal ring and the two end parts of the metal tube with two open ends successively through low temperature glass solder and a high temperature glass coating layer so as to form a hollow cavity with the outer surface of the coated metal tube with two open ends, vacuum is formed by vacuumizing, such a heat collector has a simple structure and is easy to seal, but as the glass tube is used, the risk of bursting is still not avoided. In addition, the heat transfer medium in the metal tube will expand or shrink with the change of the external temperature, and dirt is generated on an inner wall of the metal tube after a long time and is difficult to clean.

SUMMARY OF THE INVENTION

To solve the above problems, the present invention provides a vacuum heat transfer type efficient solar panel heat absorption system, which directly transfers heat through a metal tube under a vacuum condition, and heat preservation is realized at the outside of the tube by polyurethane, thereby greatly improving the heat transfer efficiency and greatly reducing the heat loss during heat transfer of a flowing medium in the tube in a circulation process.

The objective of the present invention is realized in the following manner:

A vacuum heat transfer type efficient solar panel heat absorption system includes a flat plate collector, a heat transfer pipeline, a pressure bearing water tank and a control system, a heat absorption coil is arranged in the flat plate collector, one end of the heat absorption coil communicates with the heat transfer pipeline, the other end of the heat absorption coil stretches out from the flat plate collector, and a heat absorption coil valve is arranged on the heat absorption coil stretching out from the flat plate collector; a heat exchange coil is arranged in the pressure bearing water tank, one end of the heat exchange coil communicates with the heat transfer pipeline, and the other end of the heat exchange coil stretches out from the pressure bearing water tank and is sealed; a water inlet and a water outlet are formed in the pressure bearing water tank, the water inlet is connected with a cold water pipeline, and the water outlet is connected with a hot water pipeline; a vacuum pump is arranged on the heat transfer pipeline, a solenoid valve is arranged on a pipe between the heat transfer pipeline and the vacuum pump, and both of the vacuum pump and the solenoid valve are connected with the control system; and the heat absorption coil, the heat transfer pipeline and the heat exchange coil are all copper tubes, the interiors of the copper tubes are in vacuum states, and heat absorption coating is coated on an outer surface of the heat absorption coil.

An electric heating device and a thermometer are arranged in the pressure bearing water tank, and both of the electric heating device and the thermometer are connected with the control system.

A heat preservation layer is coated at the outside of the heat transfer pipeline.

The heat preservation layer is made of a polyurethane material.

Protection layer floating glass is arranged in the flat plate collector.

The control system is a control cabinet.

Compared with the prior art, in the present invention, the interiors of the copper tubes are vacuumized, when a part of energy radiated by the sun is transferred onto the copper tubes in a heat collection plate, this part of energy is directly, quickly and efficiently transferred to a copper coil in the water tank through the copper tubes, as the interiors of the copper tubes are vacuumized, and the polyurethane at the outside of the tubes preserve the heat in the process, compared with the heat transfer of the traditional anti-freezing solution or water and other media, this manner greatly improves the heat transfer efficiency and greatly reduces the heat loss during the heat transfer of the flowing medium in the tubes in a circulation process, heat exchange is carried out with the water in the water tank, and the heat is finally supplied to a client for use. In addition, the interiors of the copper tubes are in the vacuum states, the heat transfer is realized with no medium, and thus the freezing problem of an engine pipeline is solved.

BRIEF DESCRIPTION OF THE DRAWINGS

FIG. 1 is a structural schematic diagram of the present invention.

Reference signs: 1 represents a flat plate collector; 2 represents a heat transfer pipeline; 3 represents a pressure bearing water tank; 4 represents a control system; 5 represents a heat absorption coil; 6 represents a heat absorption coil valve; 7 represents a heat exchange coil; 8 represents a water inlet; 9 represents a water outlet; 10 represents a cold water pipeline; 11 represents a hot water pipeline; 12 represents a vacuum pump; 13 represents an electric heating device; and 14 represents a heat preservation layer.

DETAILED DESCRIPTION OF THE EMBODIMENTS

A vacuum heat transfer type efficient solar panel heat absorption system includes a flat plate collector 1, a heat transfer pipeline 2, a pressure bearing water tank 3 and a control system 4, a heat absorption coil 5 is arranged in the flat plate collector 1, one end of the heat absorption coil 5 communicates with the heat transfer pipeline 2, the other end of the heat absorption coil 5 stretches out from the flat plate collector 1, and a heat absorption coil valve 6 is arranged on the heat absorption coil 5 stretching out from the flat plate collector 1; a heat exchange coil 7 is arranged in the pressure bearing water tank 3, one end of the heat exchange coil 7 communicates with the heat transfer pipeline 2, and the other end of the heat exchange coil stretches out from the pressure bearing water tank 3 and is sealed; a water inlet 8 and a water outlet 9 are formed in the pressure bearing water tank 3, the water inlet 8 is connected with a cold water pipeline 10, and the water outlet 9 is connected with a hot water pipeline 11; a vacuum pump 12 is arranged on the heat transfer pipeline 2, a solenoid valve is arranged on a pipe between the heat transfer pipeline 2 and the vacuum pump 12, and both of the vacuum pump 12 and the solenoid valve are connected with the control system 4; and the heat absorption coil 5, the heat transfer pipeline 2 and the heat exchange coil 7 are all copper tubes, the interiors of the copper tubes are in vacuum states, and heat absorption coating is coated on an outer surface of the heat absorption coil 5.

The heat absorption coil 5 stretches out from the flat plate collector 1 to facilitate the series-parallel connection between the flat plate collectors 1, and the heat absorption coil valve 6 is arranged to seal the heat absorption coil 5.

The heat exchange coil 7 stretches out from the pressure bearing water tank 3 and is sealed for fixing the heat exchange coil 7 so as to prevent the heat exchange coil 7 from shaking in a carrying process of the pressure bearing water tank 3.

The heat absorption coating coated on the outer surface of the heat absorption coil 5 is existing solar heat absorption coating, such as aluminum anodized coloring coating, a vacuum evaporation film coating layer or coating with a transition metal composite oxide as pigment, etc.

An electric heating device 13 and a thermometer T2 are arranged in the pressure bearing water tank 3, and both of the electric heating device 13 and the thermometer T2 are connected with the control system 4. When the sunlight is insufficient or at night, in order to increase the use efficiency of the pressure bearing water tank 3, the electric heating device 13 is arranged in the pressure bearing water tank 3, the thermometer T2 detects the temperature of water in the pressure bearing water tank 3 in real time and sends detection data to the control system 4, the control system 4 compares the water temperature with a set water temperature value, and when the detected temperature of water in the pressure bearing water tank 3 is lower than the set water temperature value, the control system 4 controls the electric heating device 13 to switch on; and when the detected temperature of water in the pressure bearing water tank 3 is higher than the set water temperature value, the control system 4 controls the electric heating device 13 to switch off.

A heat preservation layer 14 is coated at the outside of the heat transfer pipeline 2, and the heat preservation layer 14 is made of a polyurethane material so as to reduce the heat loss in a transfer process and improve the heat transfer efficiency.

Protection layer floating glass is arranged in the flat plate collector 1 to protect the heat absorption coil 5.

The control system 4 is a control cabinet.

The thicknesses of the calandrias of the original outlet type flat plate collectors are 0.8-1.0 mm, the thicknesses of main tubes are about 1.0-1.2 mm, in the existing flat plate collectors sold at home, the thicknesses of the calandrias are generally 0.5 mm, and the thicknesses of the main tubes are generally 0.6 mm. The heat conductivity coefficient of the copper tube is $\lambda=379.14$ W/(m.° C.), and compared with the other tubes, the heat conductivity coefficient is higher; the heat exchange parameters are as shown in Table 1:

| Tube | Copper tube | Nickel copper tube | 304/316 stainless steel tube |
|---|---|---|---|
| Density t/m3 | 8.4 | 8.9 | 8 |
| Yield strength MPa | 120 | 140 | 280-350 |
| Tensile strength MPa | 330 | 390 | 550-659 |
| Ductility % | 60 | 43 | 30-60 |
| Elasticity modulus MPa | 13.3 | 15.4 | 20 |
| Thermal coefficient of expansion 10-6 | 16 | 16 | 17 |
| Heat conductivity coefficient w/mk | 100 | 30 | 13 |

The cover plates of the existing flat plate collectors include single-layer glass, hollow glass, vacuum glass and the like, and the surface temperatures of corresponding heat absorption bodies are respectively 100° C., 150° C. and 200° C. The flat plate collector is in a braised sunning state in general, and the cooper tube in the plate can generally reach about 200° C. Heat transfer is realized by the medium in the copper tube in a traditional circulation process, the general heat loss can reach at least about 15%, the interior of the copper tube in the present invention is vacuumized, the heat transfer is directly realized by the copper tube, so the heat loss is very small, and the heat transfer efficiency is greatly improved.

The heat transfer coefficient of the copper tube is the highest, it means that the heat conductivity is stronger, the heat conductivity coefficient of copper is up to 377 W/m.° C. (under the condition of 100° C.), the high borosilicate glass is a poor conductor with average specific heat of (20-100° C.) 1.2 $WM^{-1}K^{-1}$, and under the same conditions, the heat performance of the copper tube is much stronger than a high borosilicate glass tube.

The working process of the present invention is as follows: before the efficient solar panel heat absorption system starts working, the solenoid valve and the vacuum pump 12 are firstly opened through the control system 4, the vacuum pump vacuumizes the heat absorption coil 5, the heat transfer pipeline 2 and the heat exchange coil 7, when the vacuum degrees in the tubes reach the set values, the control system 4 controls the vacuum pump to stop working, the solenoid valve is closed, and the interiors of the heat absorption coil 5, the heat transfer pipeline 2 and the heat exchange coil 7 are in vacuum states.

The heat absorption coil 5 absorbs solar energy through the heat absorption coating on the outer surface, and transfers the solar energy to the heat exchange coil 7 through the heat transfer pipeline 2, the heat in the heat exchange coil 7 performs heat exchange with the water in the pressure bearing water tank, the temperature of the heat exchange coil 7 is reduced, the temperature of the water in the pressure bearing water tank rises, cold water enters the pressure bearing water tank from the cold water inlet, and hot water flows out of the pressure bearing water tank from the hot water outlet.

When the sunlight is insufficient in cloudy days or at night, in order to increase the use efficiency of the pressure bearing water tank 3, the electric heating device 13 is arranged in the pressure bearing water tank 3, the thermometer T2 detects the temperature of water in the pressure bearing water tank 3 in real time and sends detection data to the control system 4, the control system 4 compares the water temperature with a set water temperature value, and when the detected temperature of water in the pressure bearing water tank 3 is lower than the set water temperature value, the control system 4 controls the electric heating device 13 to switch on; and when the detected temperature of water in the pressure bearing water tank 3 is higher than the set water temperature value, the control system 4 controls the electric heating device 13 to switch off.

The foregoing descriptions are merely preferred embodiments of the present invention, it should be noted that, those skilled in the art can make various variations and improvements without departing from the overall concept of the present invention, and these variations and improvements should also be deemed as the protection scope of the present invention.

What is claimed is:

1. A vacuum heat transfer type efficient solar panel heat absorption system, comprising a flat plate collector (1), a heat transfer pipeline (2), a pressure bearing water tank (3) and a control system (4), wherein a heat absorption coil (5) is arranged in the flat plate collector (1), one end of the heat absorption coil (5) communicates with the heat transfer pipeline (2), the other end of the heat absorption coil (5) stretches out from the flat plate collector (1), and a heat absorption coil valve (6) is arranged on the heat absorption coil (5) stretching out from the flat plate collector (1); a heat exchange coil (7) is arranged in the pressure bearing water tank (3), one end of the heat exchange coil (7) communicates with the heat transfer pipeline (2), and the other end of the heat exchange coil stretches out from the pressure bearing water tank (3) and is sealed; a water inlet (8) and a water outlet (9) are formed in the pressure bearing water tank (3), the water inlet (8) is connected with a cold water pipeline (10), and the water outlet (9) is connected with a hot water pipeline (11); a vacuum pump (12) is arranged on the heat transfer pipeline (2), a solenoid valve is arranged on a pipe between the heat transfer pipeline (2) and the vacuum pump (12), and both of the vacuum pump (12) and the solenoid valve are connected with the control system (4); and the heat absorption coil (5), the heat transfer pipeline (2) and the heat exchange coil (7) are all copper tubes, the interiors of the copper tubes are in vacuum states, and heat absorption coating is coated on an outer surface of the heat absorption coil (5).

2. The vacuum heat transfer type efficient solar panel heat absorption system of claim 1, wherein an electric heating device (13) and a thermometer (T2) are arranged in the pressure bearing water tank (3), and both of the electric heating device (13) and the thermometer (T2) are connected with the control system (4).

3. The vacuum heat transfer type efficient solar panel heat absorption system of claim 1, wherein a heat preservation layer (14) is coated at the outside of the heat transfer pipeline (2).

4. The vacuum heat transfer type efficient solar panel heat absorption system of claim 3, wherein the heat preservation layer (14) is made of a polyurethane material.

5. The vacuum heat transfer type efficient solar panel heat absorption system of claim 1, wherein protection layer floating glass is arranged in the flat plate collector (1).

6. The vacuum heat transfer type efficient solar panel heat absorption system of claim 1, wherein the control system (4) is a control cabinet.

* * * * *